United States Patent [19]

Foley

[11] Patent Number: 5,793,911
[45] Date of Patent: Aug. 11, 1998

[54] ILLUMINATION DEVICE

[75] Inventor: John Foley, Prestatyn, United Kingdom

[73] Assignee: Pilkington P.E. Limited, Mercyside, United Kingdom

[21] Appl. No.: 498,577

[22] Filed: Jul. 6, 1995

[30] Foreign Application Priority Data

Jul. 8, 1994 [GB] United Kingdom .................. 9413792

[51] Int. Cl.⁶ .................................................. G02B 6/04
[52] U.S. Cl. ............... 385/31; 385/901; 385/115; 385/121; 362/32
[58] Field of Search .................. 439/61, 62; 385/31, 385/902, 116, 115, 121; 362/32

[56] References Cited

U.S. PATENT DOCUMENTS

| | | | |
|---|---|---|---|
| 4,280,125 | 7/1981 | Kazan | 340/795 |
| 5,018,007 | 5/1991 | Lang | 358/60 |
| 5,042,892 | 8/1991 | Chiu et al. | 385/114 |
| 5,222,795 | 6/1993 | Hed | 362/32 |
| 5,301,090 | 4/1994 | Hed | 362/32 |

FOREIGN PATENT DOCUMENTS

| | | |
|---|---|---|
| 0525381 | 2/1993 | European Pat. Off. . |
| 2233116 | 2/1991 | United Kingdom . |

*Primary Examiner*—John Ngo
*Attorney, Agent, or Firm*—Young & Basile, P.C.

[57] ABSTRACT

An illumination device 1 and methods for producing said device and parts thereof for backlighting a liquid crystal display 3 wherein the illumination device comprises a solid substrate 5 containing at least one groove 11 and an optical fiber 7 comprising an inner core 23 and an outer cladding layer 25 fitted into the groove(s) 11. The outer cladding layer 25 is of reduced thickness on the exposed side of the core 23 such that, light supplied along the optical fiber 7 from a light source 9, is transversely emitted from the optical fiber through the reduced thickness layer 14.

9 Claims, 2 Drawing Sheets

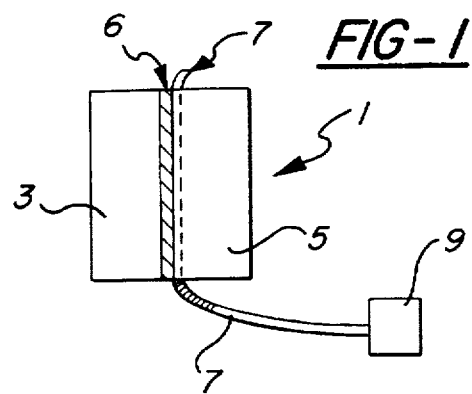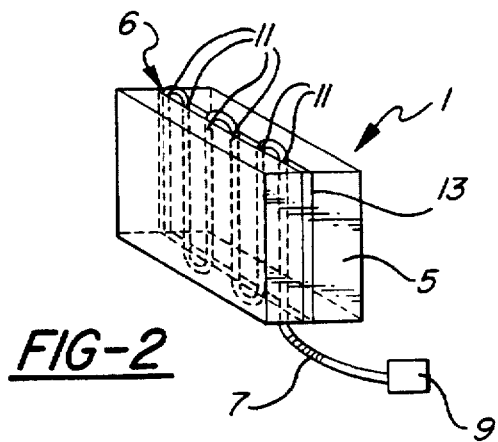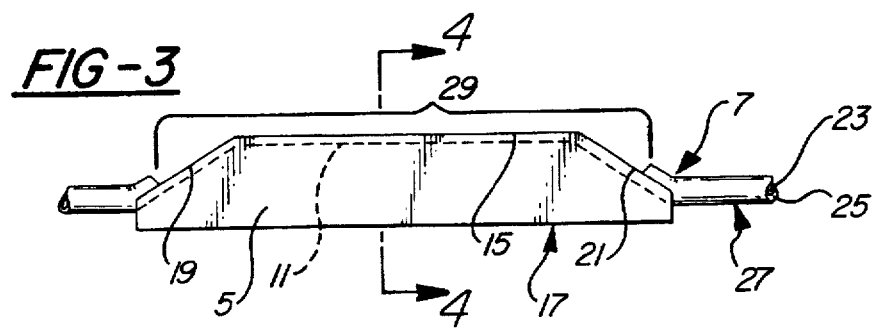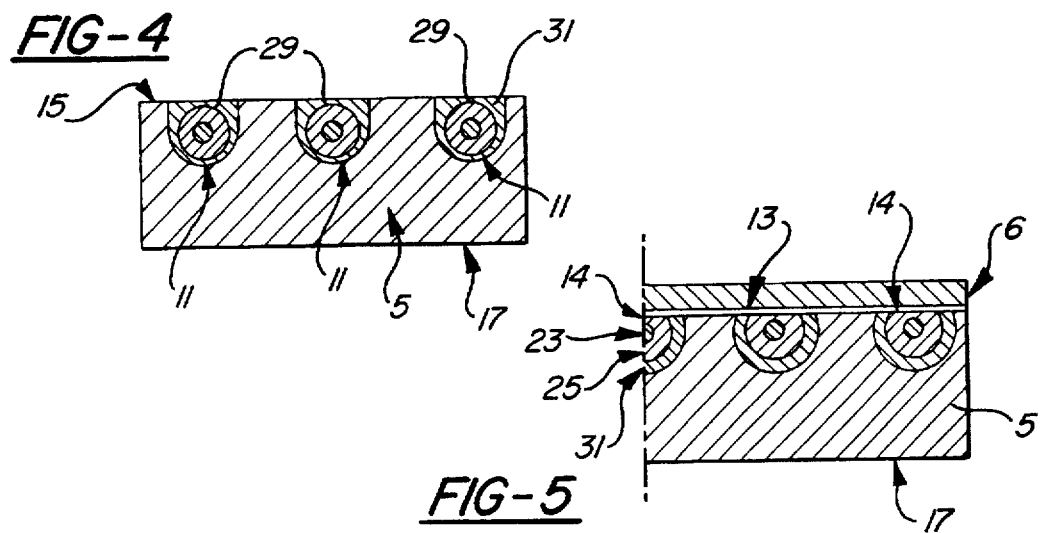

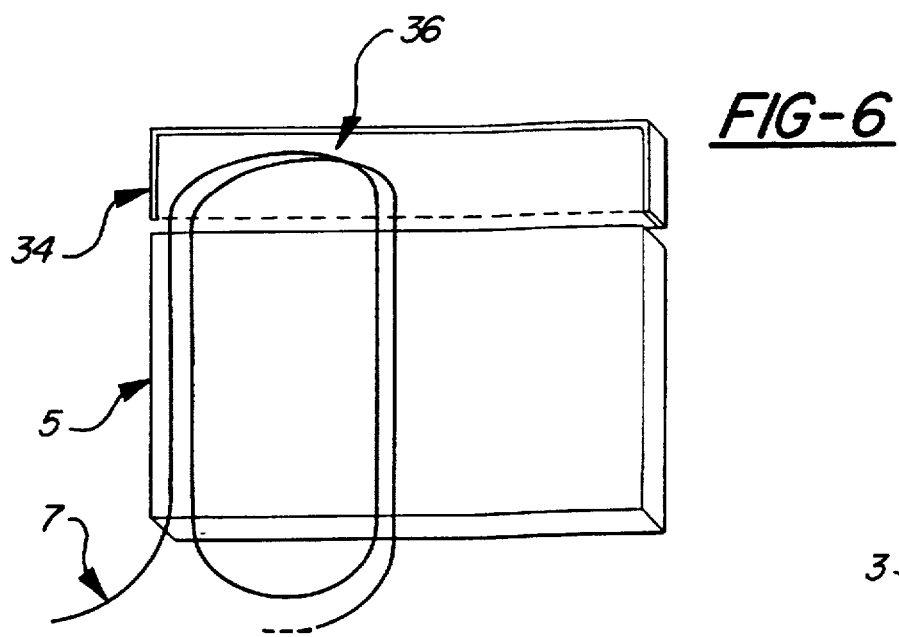
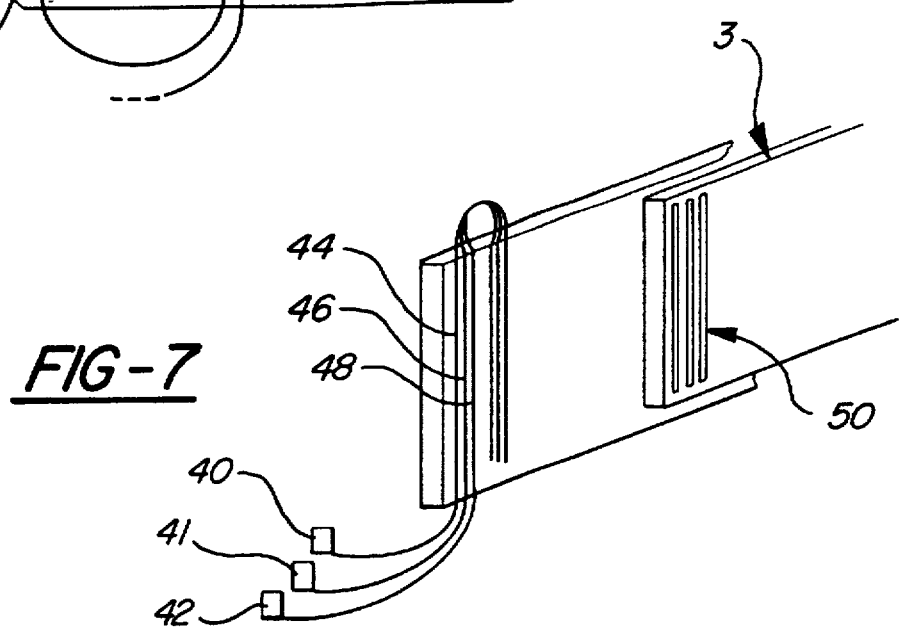
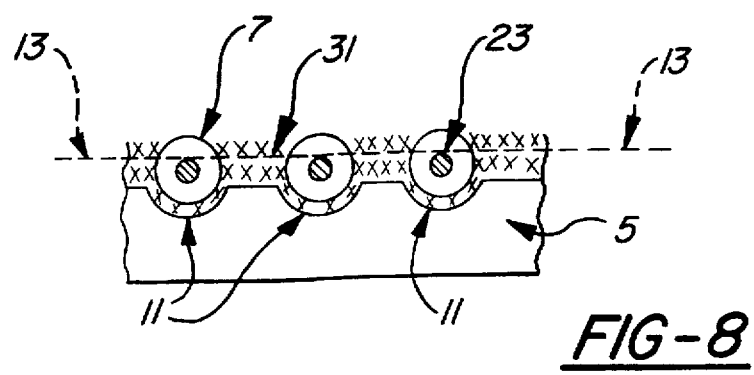

ILLUMINATION DEVICE

The present invention relates to an illumination device for backlighting a liquid crystal display (LCD).

Liquid crystal displays (LCDs) are frequently used for a variety of display applications. However, the LCDs are non-emissive and require to be illuminated from a light source, such as a backlight. That is, the LCD modulates the transmission of light, but does not emit it. Conventional backlights for LCDs are of slab-like construction emitting with uniform illumination typically based on fluorescent lamps, but these have a number of disadvantages, in particular they are inefficient, bulky, create thermal problems, require complex and wasteful diffusers to get uniform illumination, and they offer limited lifetimes.

Generally speaking the present invention provides an illumination device comprising an optical fibre longitudinally extending on and supported by a substrate, the optical fibre emitting light transversely from its core as distinct from emitting light from the core end.

The present invention provides an illumination device for backlighting a liquid crystal display, which comprises;

a solid substrate having a surface in which at least one groove is formed at least one optical fibre extending along and immobilised within the groove or grooves, the optical fibre comprising an inner core surrounded by an outer cladding layer a light source connected to an end of the optical fibre for supplying light along said optical fibre wherein the outer cladding layer along a length of the immobilised fibre is of reduced thickness on the exposed side of the core, and the arrangement is such as to allow transverse emission of light from said optical fibre through said reduced thickness cladding layer.

Transverse emission from the fibre will be enhanced by placing the reduced thickness cladding surface in contact with a cover material of higher refractive index than the cladding. This cover material may be a fluid or, more preferably, a solid plate. A glass plate is the preferred arrangement bonded to the polished surface.

The light source can be selected to supply the required form of light for any given application. The light supplied may be monochromatic or multichromatic and can also be polarised; allowing for conventional filters diffusers and polarisers to be omitted, thereby reducing the bulk of the backlight and also increasing efficiency.

Preferably the light source is a laser diode butt-coupled to the optical fibre. The optical fibre is intended to be a single fibre or a small number, e.g. 10 of single fibres as distinct from a fibre bundle which has a multitude of fibres, e.g. 100. Accordingly the light source is easily coupled to the single or small number of fibres which are then able to transmit significant distances without major loss of light (prior to the transverse emission of the present invention). Thus the fibre may be many meters in length.

The optical fibre may have any form of core/cladding/sheath combination and may be mono-mode or multi-mode. The preferred form of fibre has a glass core and a glass cladding.

The substrate employed is able to impart sufficient mechanical strength to support the optical fibre and is preferably suitable for polishing down, in particular the substrate may be a thin glass or quartz plate (e.g. only 2 or 3 mm in thickness). Alternatively a completely opaque substrate may be used, for example a thin metal sheet. In this case the fibre(s) may be located in very shallow grooves of uniform depth along the groove so that the core/cladding surface is proud of the substrate and may be polished without polishing the substrate material. Preferably the fibres would be so densely packed in side-by side but non overlapping relationship so as to be in mutual contact, and would be firmly secured in place with a suitable optical adhesive which could also be polished. For applications where it is desirable to stack a series of illumination devices one on top of the other, it is necessary to use a transparent substrate, preferably a plane-parallel glass substrate.

Preferably a multiplicity of parallel grooves are formed in the substrate allowing for a length of one or more fibres to be fitted into a series of grooves. More preferably the grooves are densely packed over the surface area of the substrate each having a length of fibre immobilised therein with a reduced thickness cladding layer to allow many lengths of fibre to emit transversely, for example the fibres may be in mutual side-by-side abutting contact thereby maximising the intensity of emitted illumination.

The optical fibre is immobilised into the grooves for example by cement. The cement can be selected to have a required refractive index to allow transmission of light therethrough, or not, as the case may be, and to match the mechanical properties of the substrate. The optical fibre must be immobilised in the substrate along its emitting length.

The reduced thickness outer cladding layer on one side of the core adjacent the substrate surface may be formed by removal of part of the original outer cladding by a process such as polishing after the optical fibre has been immobilised in the grooves. Or alternatively, the optical fibre may be manufactured to have a non-uniform cladding thickness prior to immobilisation in the groove. In this latter case further polishing may be required. For this particular application it may be beneficial to ensure that the final polishing stages are relatively coarse, providing substantial scatter of the light coupled out into the evanescent field. This will help to ensure a uniform illumination, over a wide range of angles, without the use of an additional diffuser element or transmission plate in contact with the polished surface.

Because the light is supplied along the optical fibre and is emitted transversely from the fibre core via the evanescent field, the intensity of the emitted light will decrease along the emitting length of the optical fibre or from one emitting length to the next, resulting in nonuniformity of emitted illumination.

It is important for there to be uniform illumination on a back-lit LCD and this can be achieved in a number of ways using the illumination device of the present invention. It is possible to supply the optical fibre from both ends using a standard Y-split coupler feeding light from the single source into both ends of the optical fibre. Further, two or more optical fibres immobilised on the substrate may be fed from one or more light sources to achieve uniform illumination on the LCD.

Alternatively by varying the cladding thickness along the length of the fibre, differing intensities of emission can be achieved along the emitting length. Preferably the cladding thickness is varied along the length of the fibre in order that the optical fibre has less light emissivity in the region closest to the light source and greater light emissivity in regions further away from the light source, to compensate for attenuation loss along the length of the fibre and thereby equalising the intensity of emitted light along the emitting length. This could be achieved for example by starting with a substrate with a convex surface, perpendicular to the optical fibre immobilised in the grooves, each groove being of uniform depth. The convex surface and the optical fibre core are then polished down to produce a flat polished surface. The reduced thickness cladding layer will be thinner towards the centre of the flat surface, than at the edge, thereby allowing a differential degree of light emission to be achieved across the polished surface. The optical fibre(s) can be fitted into the grooves in such a way as to allow uniform emission of light after polishing, on the LCD. Alternatively, the groove depth for each groove may be varied across the substrate, so as to ensure a differential cladding thickness of the immobilised optical fibre, after polishing, in order to enhance uniformity.

The optical fibre or fibres need not be fitted into the grooves in a simple sequential groove-by-groove distribution. More complex arrangements can be devised and the sequence of grooves into which the fibre is fitted can be selected to optimise the uniformity of illumination.

The fibre must be bent as it exits one groove in order to be fitted into another. All optical fibres have a minimum bend radius, so it is preferable to arrange for the fibre not to be fitted with its successive emitting lengths in successive grooves. For example, if one fibre is to be fitted into sequentially numbered parallel grooves 1–6, the order of successive emitting lengths may be 1,4,2,5,3,6. That is, the fibre is fitted to groove 1 then groove 4, then groove 2, then groove 5 and so on.

If three optical fibres 1,2,3, are to be fitted into sequential grooves, A,B,C,A,B,C,A,B,C, then optical fibre 1 may be fitted into grooves A—A—A, fibre 2 into grooves B—B—B and fibre 3 into grooves C—C—C. Once the distribution is optimised, a customised housing can be manufactured to protect the fibre loops extending in space between substrate grooves. Any Y-splitters used to provide light input into both fibre ends or multiple fibre winds, can also be fitted into the protective housing.

The present invention may optionally be employed to provide a multi-coloured illumination device. Three separate colour laser diodes could be used (red, green and blue)—each giving a monochromatic output. The three colours of light can be supplied along a single or separate optical fibres of the illumination device, and by varying the source intensities, any particular illumination colour may be achieved. The illumination colours available would be determined by the spectral positions of the laser diode output wavelengths. This approach would greatly simplify the design of the LCD colour filters mosaic and would result in a far more efficient LCD cell as regards transmissiveness.

Alternatively each colour (red, green or blue) may be fed into a separate illumination device which are then stacked one on top of the other.

Detailed descriptions of embodiments of the present invention will now be described by way of example with reference to the following drawings, in which:

FIG. 1 shows a schematical representation of an illumination device of the present invention in use as a backlight for an LCD;

FIG. 2 is a different view of the FIG. 1 device to illustrate a detail;

FIG. 3 shows a side elevation of part of the FIG. 1 device during the course of manufacture.

FIG. 4 shows a cross-sectional elevation along line A—A in FIG. 3.

FIG. 5 is the same view as FIG. 4 but showing the part of the FIG. 1 device after manufacture;

FIG. 6 shows a modification of part of the FIG. 1 device;

FIG. 7 shows part of a further embodiment of an illumination device in accordance with the present invention; and FIG. 8 illustrates a modified production process.

FIG. 1 shows a schematic representation of an illumination device 1 for backlighting an LCD 3. The illumination device 1 comprises a glass substrate 5, an optical fibre 7 fitted to a surface of the substrate 5 as will be explained, a glass transmission plate 6 at the same surface, and a light source 9. Typically the size of the plate 6 is in the range 25 mm by 25 mm to 150 mm by 150 mm.

FIG. 2 shows a perspective view in detail of part of the illumination device 1 in use as a backlight for the LCD 3. The substrate 5 has multiple parallel grooves 11 cut therein, each groove having a uniform depth along the groove 11 and the single optical fibre 7 has successive lengths immobilised into the grooves with inter-length loops extending into free space. Light is supplied along the optical fibre 7 from the light source 9, which is butt-coupled to one end of the fibre 7, and is emitted transversely to a polished substrate surface 13. The polished surface 13 is placed, preferably using cement, in contact with plate 6 having high refractive index and behind the LCD 3 so that the transversely emitted light illuminates the LCD 3. At surface 13 the fibre 7 has an outer cladding layer of reduced thickness on one side of the core and that fibre length presents a surface which is co-planar with substrate surface 13. This is illustrated in FIG. 5.

The preferred method of manufacturing the substrate 5 with its fibre 7 fitted thereto is now explained with reference to FIGS. 3 and 4 which shows the substrate 5 initially having surfaces 15 and 17, the former surface having tapered or inclined ends 19,21. During manufacture surface 15 is polished down to form surface 13 previously described. Each groove 11 is first formed in and extends across the surface 15 and is of uniform depth across the surface 15. The optical fibre 7 which has an inner core 23, an outer cladding 25 and a sheath 27 first has its sheath 27 removed to form a bared length 29 and the bared length 29 is fitted to and immobilised with cement 31 in the groove 11 such that it extends between the inclined edges 19 and 21.

The grooves 11 are cut into the substrate 5 to a depth greater than the diameter of the bared length 29 and then the entire surface 15 is polished down. Polishing is continued as part of the cladding 25 is removed and until such time as the layer of cladding 25 on the upper side of the core 23 is sufficiently thin to permit light to be emitted transversely from the fibre 7, i.e. perpendicular to the polished surface of the substrate 5 when a medium of higher index is in optical contact with that surface. When this condition has been achieved the substrate surface 15 has been reduced to form surface 13 previously discussed and the cladding 25 has been reduced to its reduced thickness layer 14. Intermittently during manufacture a high index optical fluid is loaded onto the polished surface of the substrate and the fibre end is coupled to a test light source to determine whether or not there is sufficient transverse illumination from the device. When polishing has been completed the light transmission plate 6 is bonded by optical cement to the polished surface to permit transverse illumination of the device in use.

Alternative manufacture, with a solid opaque (e.g. metal) substrate, entails packing the fibre lengths densely into shallow grooves and embedding the proud fibre surfaces in optical cement. A similar polishing process is then employed to produce a thin cladding on the proud surface, as illustrated in FIG. 8.

In the modification shown in FIG. 6 the substrate 5 is provided with a multiplicity of parallel grooves 11 which are densely packed on the surface 13 and in order to minimise the length of the fibre loops 36 which extend into space at the tapered edges 19.21 and accommodate the minimum bend radius of the fibre 7 with its sheath 27 the fibre is not fitted into successive grooves. Instead the fibre is looped from the first groove to say the tenth groove then looped back to the second groove and then looped forward to the eleventh groove etc. Other sequences of groove fittings are of course possible. The free fibre loops 36 are protected by a housing 34 which may be bonded at its edges to the substrate 5 and plate 6.

In a further embodiment, the illumination device can be adapted for a multi-coloured illumination device as shown schematically in FIG. 7. Three separate colour light sources 40,41,42 each emitting a monochromatic output (red, green, blue) are coupled to three optical fibres 44,46,48 which are immobilised side-by-side on a substrate 5, giving a vertical colour stripe effect. Alignment of the optical fibres 44,46,48 is designed to precisely match the spacing of columns of pixels 50 in the LCD 3 and provide a highly efficient full colour display.

I claim:

1. An illumination device (1) for backlighting a liquid crystal display (3), comprising:
    a solid substrate (5) having a surface in which is formed a multiplicity of grooves (11) which are parallel and densely packed over the surface;
    an optical fibre (7) having portions along its length which are fitted to and immobilized within respective grooves (11) by cement selected to have a required refractive index to match the mechanical properties of the substrate (5);
    a light source (9) connected to an end of the optical fibre (7) for supplying light along said optical fibre (7);
    wherein the optical fibre (7) comprises an inner core (23) surrounded by an outer cladding layer (25) with the outer cladding layer of each immobilized fibre portion of reduced thickness (14) on one side of the core such as to allow transverse emission of light through said reduced thickness (14), the reduced thickness having been formed by removal by polishing of part of the original cladding layer (25) after the fibre portions have been immobilized in the grooves (11), the arrangement being such that after polishing the polished fibre portions and the surface of the substrate lie in a common plane (13);
    and a transparent cover plate (6) bonded throughout said common plane (13) so as to be in contact with said reduced thickness cladding portions (14), the cover plate (6) being made of material having a higher refraction index than the cladding.

2. An illumination device according to claim 1, further comprising a housing (34) arranged to protect loops (36) of the optical fibre (7) which extend in space between the optical fibre portions which are immobilized in the substrate grooves (11).

3. An illumination device according to claim 1 wherein successive emitting portions of the optical fibre (7) are not fitted into neighboring grooves (11).

4. An illumination device according to claim 1 wherein the cover plate (6) is made of glass.

5. An illumination device according to claim 1 wherein the light source (9) is a laser diode butt-coupled to the optical fibre (7).

6. An illumination device according to claim 1 wherein the reduced cladding thickness (14) varies along the length of light emissivity in the emitting portions further away from the light source (9) to compensate for attenuation losses along the length of the fibre (7) and thereby equalizing the intensity of emitted light along the emitting portions of the fibre (7).

7. An illumination device according to claim 1 wherein light is supplied from the light source (9) to both ends of the optical fibre (7) so as to permit uniform light emission along the emitting portions of the fibre (7).

8. An illumination device according to claim 1 wherein the substrate (5) is a thin plate and the grooves (11) are formed in one of the faces of the plate.

9. An illumination device according to claim 1 wherein the device comprises three separate monochromatic color laser diode light sources, red, green, and blue, each color of light being fed along a respective optical fibre (7) each of which has portions along its length which are fitted to and immobilized within respective grooves (11), and the source intensity being variable so that any particular transversely emitted illumination color can be achieved.

* * * * *

UNITED STATES PATENT AND TRADEMARK OFFICE
CERTIFICATE OF CORRECTION

PATENT NO. : 5,793,911
DATED : August 11, 1998
INVENTOR(S) : Foley

It is certified that error appears in the above-identified patent and that said Letters Patent is hereby corrected as shown below:

Column 3, line 60, change "A-A" to --4-4--.

Signed and Sealed this

Sixteenth Day of February, 1999

Attest:

Attesting Officer

Acting Commissioner of Patents and Trademarks